US010346336B2

(12) United States Patent
Tominaga

(10) Patent No.: US 10,346,336 B2
(45) Date of Patent: Jul. 9, 2019

(54) SEMICONDUCTOR DEVICE, METHOD OF CONTROLLING SEMICONDUCTOR DEVICE, AND SEMICONDUCTOR SYSTEM

(71) Applicant: Renesas Electronics Corporation, Tokyo (JP)

(72) Inventor: Masashi Tominaga, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 15/728,624

(22) Filed: Oct. 10, 2017

(65) Prior Publication Data

US 2018/0101493 A1 Apr. 12, 2018

(30) Foreign Application Priority Data

Oct. 12, 2016 (JP) .................................. 2016-200880

(51) Int. Cl.
| | |
|---|---|
| *G06F 13/38* | (2006.01) |
| *G06F 13/42* | (2006.01) |
| *G06F 1/26* | (2006.01) |
| *G06F 13/40* | (2006.01) |

(52) U.S. Cl.
CPC ............ *G06F 13/385* (2013.01); *G06F 1/266* (2013.01); *G06F 13/4081* (2013.01); *G06F 13/4282* (2013.01); *G06F 2213/0042* (2013.01)

(58) Field of Classification Search
CPC .... G06F 13/385; G06F 1/266; G06F 13/4081; G06F 13/4282
USPC ......................................................... 710/313
See application file for complete search history.

(56) References Cited

U.S. PATENT DOCUMENTS

| | | | | |
|---|---|---|---|---|
| 5,615,344 | A * | 3/1997 | Corder ................. | G06F 9/4415 710/100 |
| 9,400,546 | B1 * | 7/2016 | Agarwal ................. | G06F 1/266 |
| 9,619,979 | B1 * | 4/2017 | Montero ............. | H01R 13/641 |
| 9,800,233 | B1 * | 10/2017 | Abu Hilal ................ | H03K 5/08 |
| 2005/0261026 | A1 * | 11/2005 | Hausman ............. | G05B 19/054 455/559 |

(Continued)

FOREIGN PATENT DOCUMENTS

JP 2012-123673 A 6/2012

OTHER PUBLICATIONS

Designing a Type-C Electronically Marked Cable—Part 1 Jun. 28, 2016 (Year: 2016).*

(Continued)

*Primary Examiner* — Paul R. Myers
(74) *Attorney, Agent, or Firm* — McDermott Will & Emery LLP

(57) ABSTRACT

The disclosed invention is to provide a semiconductor device enabling it to access an internal device within a USB cable in a simple way. Disclosed is a semiconductor device which is able to be coupled to at least one USB cable and which includes a decision unit that decides whether or not an opposite-end device is detected through the USB cable; and a control unit that, if the decision unit has judged that the opposite-end device is not detected through the USB cable, supplies one of two signal lines which are coupled to an internal device within the USB cable with a power supply voltage and implements control of communication with the internal device within the USB cable through the other one of the signal lines.

9 Claims, 8 Drawing Sheets

(56) References Cited

U.S. PATENT DOCUMENTS

| | | | | |
|---|---|---|---|---|
| 2009/0061678 A1* | 3/2009 | Minoo | ................... | H01R 29/00 |
| | | | | 439/502 |
| 2011/0276448 A1* | 11/2011 | Perper | .................... | G06Q 30/04 |
| | | | | 705/34 |
| 2012/0151231 A1 | 6/2012 | Hatta | | |
| 2014/0119425 A1* | 5/2014 | Boccaccio | ............ | G09G 5/006 |
| | | | | 375/232 |
| 2015/0137789 A1* | 5/2015 | Furtner | .................... | G05F 5/00 |
| | | | | 323/318 |
| 2016/0217103 A1* | 7/2016 | Kim | .................... | G06F 13/4282 |
| 2016/0291663 A1* | 10/2016 | Sun | ........................ | G06F 1/266 |
| 2016/0291987 A1* | 10/2016 | Lin | ....................... | G06F 9/4411 |
| 2016/0308527 A1* | 10/2016 | Kim | .................... | H03K 19/003 |
| 2017/0038810 A1* | 2/2017 | Ueki | ....................... | G06F 21/44 |
| 2018/0097516 A1* | 4/2018 | Kim | ................... | H01L 27/0248 |

OTHER PUBLICATIONS

Designing a Type-C Electronically Marked Cable—Part 2 Jun. 29, 2016 (Year: 2016).*
Universal Serial Bus Type-C Cable and Connector Specification Revision 1.2 Mar. 25, 2016 (Year: 2016).*
Universal Serial Bus Power Delivery Specification Revision 3.0 Version 1.0a Mar. 25, 2016 (redline 2017) (Year: 2016).*

* cited by examiner

100

SEMICONDUCTOR DEVICE, METHOD OF CONTROLLING SEMICONDUCTOR DEVICE, AND SEMICONDUCTOR SYSTEM

CROSS-REFERENCE TO RELATED APPLICATIONS

The disclosure of Japanese Patent Application No. 2016-200880 filed on Oct. 12, 2016 including the specification, drawings and abstract is incorporated herein by reference in its entirety.

BACKGROUND

The present invention disclosed herein relates to a semiconductor device, a method of controlling a semiconductor device, and a semiconductor system which are adapted to control a USB (Universal Serial Bus) cable.

Recently, many electronic devices such as personal computers, smartphones, and tablet terminals are equipped with a USB (Universal Serial Bus) interface. Through the USB interface, these electronic devices each can perform data communication with another electronic device and can be supplied with power from another electronic device.

In this regard, a configuration for supplying power to a USB device is disclosed in Japanese Unexamined Patent Application Publication No. 2012-123673 (Patent Document 1).

RELATED ART DOCUMENT

Patent Document

[Patent Document 1]
Japanese Unexamined Patent Application Publication No. 2012-123673

SUMMARY

Meanwhile, a USB cable is generally used to make coupling with a USB device and a configuration is known in which a chip for recognition (Electrical Marked Cable Assembly (EMCS)) is embedded in the USB cable.

To make the chip for recognition within the USB cable operate, in the past, it has been required that plugs at both ends of a USB cable be put in USB devices respectively.

Hence, a problem has arose in which, to allow access from a device coupled to one plug of a USB cable to the chip for recognition (internal device) within the USB cable, an opposite-end device must be coupled to the other plug of the USB cable.

The present invention disclosed herein is to solve the above problem and its object is to provide a semiconductor device, a method of controlling a semiconductor device, and a semiconductor system which are adapted to enable it to access an internal device within a USB cable in a simple way.

Other problems and novel features will be apparent from the description in the present specification and the attached drawings.

According to one embodiment, there is provided a semiconductor which is connectable with at least one USB cable and which includes a decision unit that decides whether or not an opposite-end device is detected through the USB cable; and a control unit that, if the decision unit has judged that the opposite-end device is not detected through the USB cable, supplies one of two lines which are coupled to an internal device within the USB cable with a power supply voltage and implements control of communication with the internal device within the USB cable through the other one of the lines.

According to one embodiment, even when an opposite-end device is not detected through a USB cable, it is possible to access an internal device within the USB cable in a simply way.

DETAILED DESCRIPTION

Figure 1:
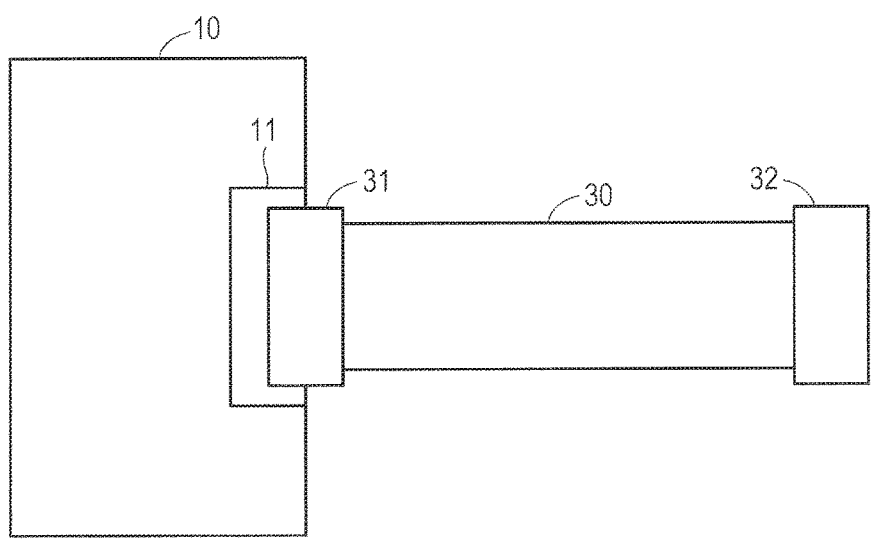
FIG. 1 is a diagram to explain a configuration of a semiconductor system 100 based on a first embodiment.

In the following, embodiments will be described in detail with reference to the drawings. In the drawings, identical or equivalent components are assigned identical reference signs and their description is no repeated.

<A. Configuration>
<a1. Configuration of a Semiconductor System 100>

FIG. 1 is a diagram to explain a configuration of a semiconductor system 100 based on a first embodiment.

With reference to FIG. 1, the semiconductor system 100 includes a maintenance device 10 and a USB cable 30.

The maintenance device 10 is equipped with a connector 11.

<a2. Configurations of the Maintenance Device 10 and USB Cable 30>

Figure 2:
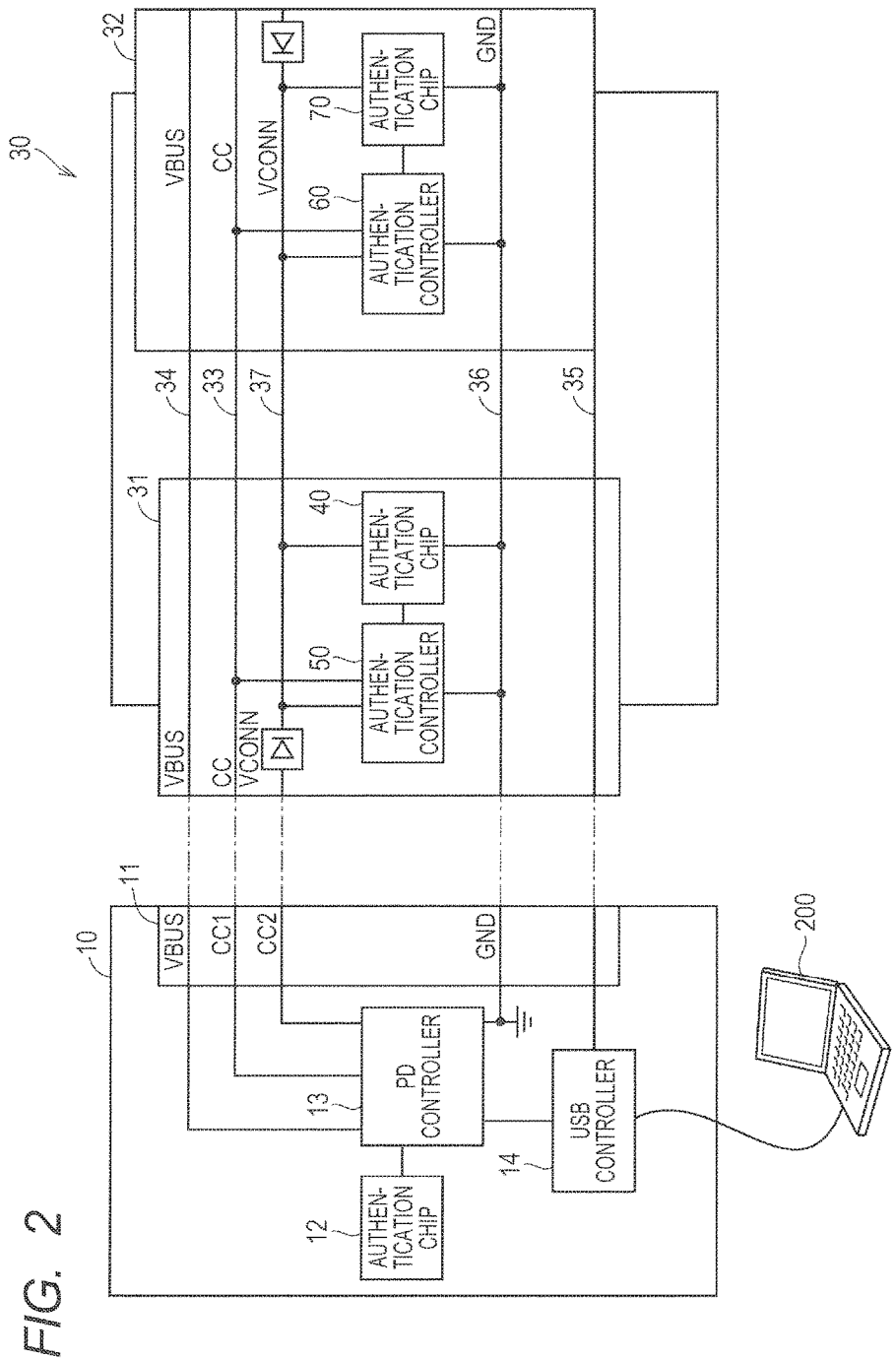
FIG. 2 is a diagram depicting a configuration of a USB cable 30 which is used in the semiconductor system 100 based on the first embodiment.

FIG. 2 is a diagram to explain internal configurations of the maintenance device 10 and the USB cable 30 based on the first embodiment.

As depicted in FIG. 2, the maintenance device 10 includes an authentication chip 12, a PD controller 13, and a USB controller 14.

The authentication chip 12 stores authentication data for making connection with a genuine product.

The USB controller 14 controls the maintenance device 10 as a whole and controls a data line 35.

The PD controller 13 controls a power supply line 34, a port configuration line 33, and a plug power supply line 37, according to instructions of the USB controller 14.

The USB cable 30 is provided with plugs 31, 32 at its both ends, respectively. A plug 31 is inserted into a connector 11. And now, in the present example, a plug 32 is not put in any USB device. Hence, the maintenance device 10 and a USB device are placed in a state in which they are not coupled through the USB cable 30.

As the USB cable 30, it is possible to use a USB Type-C cable, by way of example.

In the present example, the maintenance device 10 can be either a source-side device (the device which supplies a power supply voltage) or a sink-side device (the device which receives a power supply voltage).

Besides, the USB controller 14 is coupled with an external terminal 200 to allow communication with it. The terminal 200 gives various instructions to the USB controller 14. In the present example, the terminal 200 gives an instruction to execute a maintenance process or the like to the PD controller 13 via the USB controller 14.

The USB cable 30 includes plugs 31, 32, a power supply line 34, a port configuration line 33, a plug power supply line 37, a data line 35, and a ground line 36.

The port configuration line 33 includes a configuration channel line CC (hereinafter also referred to as a CC line) which is one or one-channel sideband signal line. The CC line is a setup line which is used to implement communication between a source-side device and a sink-side device and the like. It is also used to implement communication with an authentication controller in the present example.

The plug power supply line 37 (also referred to as a VCONN line) is a line to supply power to a chip for recognition (an internal device) which is provided inside the plug 31.

The power supply line 34 is comprised of one or more lines. The power supply line 34 includes a power supply line VBUS. The power supply line VBUS is supplied with one power supply voltage selected from a plurality of power supply voltages within power supply voltage standards. That is, the power supply line VBUS is supplied with one of the power supply voltages selectively.

As an example, the power supply line VBUS is supplied with power of 20 V and 5 A at a maximum, according to power negotiation between USB devices. In response to a request of a USB device that is coupled, for example, one of power supply voltages of 5 V, 12 V, and 20 V is selected and supplied to the USB device through the power supply line VBUS. And now, the maintenance device 10 is capable of setting up a voltage in 50-mV steps in a range from 5 V to 20 V compliant with the standards.

The data line 35 is comprised of two or more lines and implements data communication between USB devices. The data line 35 is, for example, D+/D− for USB 2.0 communication, a TX and RX pair for USB 3.1 communication, or the like.

The ground line 36 is comprised of one or more lines and includes a ground line GND.

The plug 31 includes a diode for backflow prevention, an authentication controller 50, and an authentication chip 40.

The plug 32 includes a diode for backflow prevention, an authentication controller 60, and an authentication chip 70.

<a3. Configuration of the Plug 31>

Figure 3:
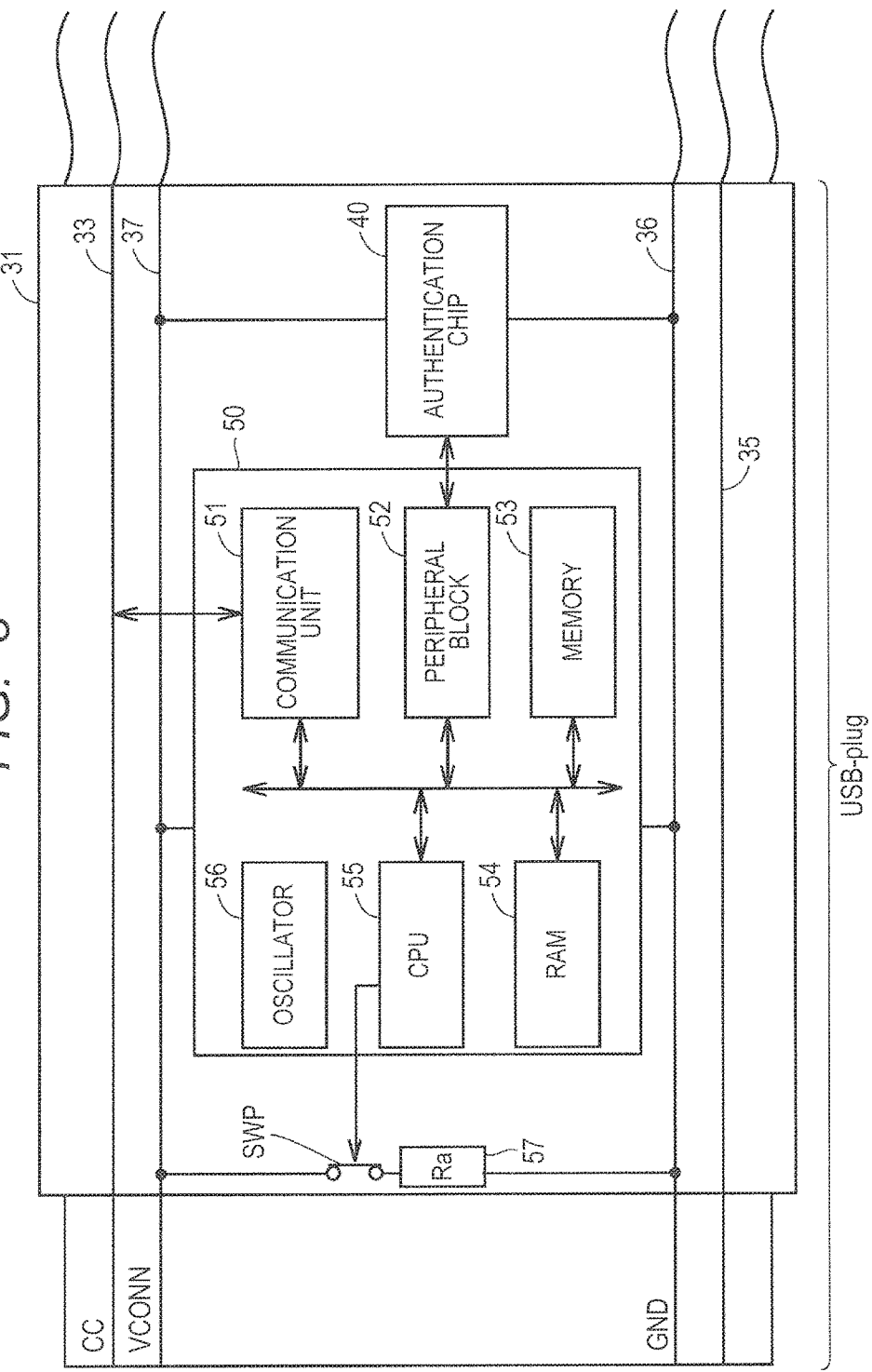
FIG. 3 is a diagram to explain a configuration of a plug 31 based on the first embodiment.

FIG. 3 is a diagram to explain a configuration of the plug 31 based on the first embodiment.

With reference to FIG. 3, an internal device is provided in the plug 31.

Specifically, the plug includes an authentication controller 50 (LSI) as the internal device, an authentication chip 40, a resistor (Ra) 57, and a switch SWP.

The authentication chip 40 stores authentication data for making connection with a genuine product.

The resistor (Ra) 57 and the switch SWP are coupled in series between the plug power supply line 37 and the ground line 36. The switch SWP is controlled by the authentication controller 50.

Specifically, the switch SWP is placed in a conductive (ON) state when the plug power supply line 37 is not supplied with a power supply voltage. On the other hand, when the plug power supply line 37 has been supplied with a power supply voltage, the switch is turned to a non-conductive (OFF) state, according to an instruction from the CPU 55.

The authentication controller 50 executes an authentication process based on the authentication data being stored on the authentication chip 40.

The authentication controller 50 includes an oscillator 56, a CPU 55, a RAM 54, a communication unit 51, a peripheral block 52, a memory 53, and a resistor 57. The respective components are interconnected by an internal bus.

The authentication controller 50 and the authentication chip 40 are coupled to the plug power supply line 37 and the ground line 36 and their operation can be controlled according to supply of a power supply voltage to the plug power supply line 37.

The oscillator generates an internal clock of the authentication controller 50. The CPU 55 controls the entire authentication controller 50 as a whole.

The RAM 54 functions as a working memory for the CPU 55 and stores a variety of necessary data.

The communication unit 51 is coupled to the port configuration line 33 and implements sending and receiving data between a source-side device and a sink-side device.

The peripheral block 52 implements data processing between it and the authentication chip 40.

The memory 53 stores programs and data for executing various processing operations in the authentication controller 50.

In the present example, the maintenance device 10 communicates with the authentication controller 50 and, by way of example, updates a program which is stored in the memory 53.

And now, the plug 32 also has the same configuration as the configuration of the plug 31 and, therefore, a detailed description on its configuration is not repeated. The authentication controller 50 and the authentication controller 60 have basically the same configuration. Also, the authentication chip 40 and the authentication chip 70 are basically the same.

Figure 4:
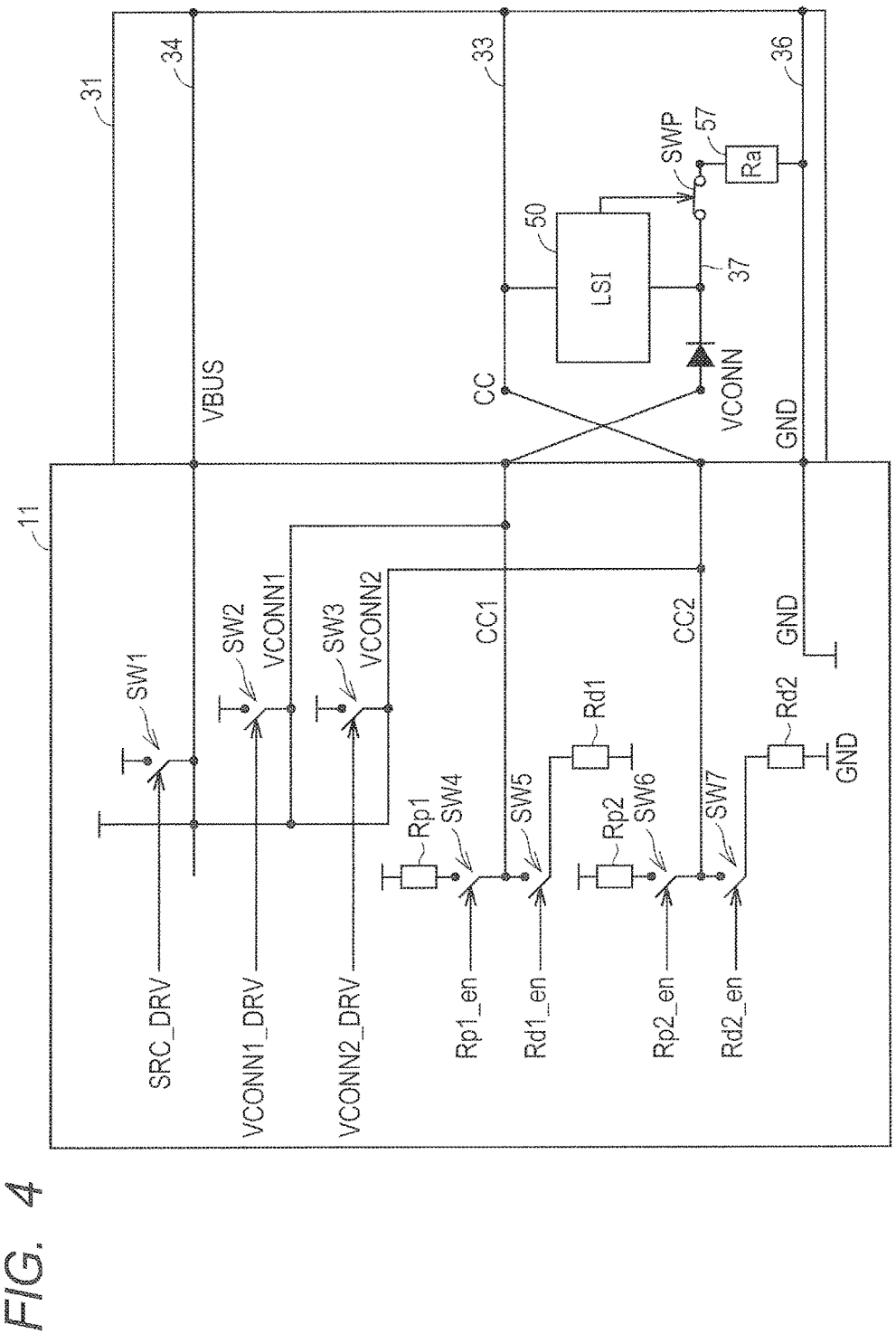
FIG. 4 is a diagram to explain an internal configuration of a connector 11 based on an embodiment.

FIG. 4 is a diagram to explain an internal configuration of the connector 11 based on the first embodiment.

As depicted in FIG. 4, the connector 11 includes switches SW1 to SW7 (hereinafter also referred to as switches SW), resistors Rp1, Rp2, and resistors Rd1, Rd2.

A switch SW1 is provided between a power supply and the power supply line 34. By turning the switch SW1 ON, the power supply line 34 is supplied with a power supply voltage.

Switches SW2, SW3 are on the lines to supply the plug power supply line 37 (VCONN line) with a power supply voltage.

A switch SW2 is provided between a VCONN1 line and the power supply and is set conductive/non-conductive according to a control signal VCONN1_DRV.

A switch SW3 is provided between a VCONN2 line and the power supply and is set conductive/non-conductive according to a control signal VCONN2_DRV.

A switch SW4 is provided in series with a resistor Rp1 between the power supply and a CC1 line and is set conductive/non-conductive according to a control signal Rp1_en.

A switch SW5 is provided in series with a resistor Rd1 between the CC1 line and a ground voltage and is set conductive/non-conductive according to a control signal Rd1_en.

A switch SW6 is provided in series with a resistor Rp2 between the power supply and a CC2 line and is set conductive/non-conductive according to a control signal Rp2_en.

A switch SW7 is provided in series with a resistor Rd2 between the CC12 line and the ground voltage and is set conductive/non-conductive according to a control signal Rd2_en.

Respective control signals to control the switches SW1 to SW7 are output from the PD controller 13.

One of the CC1 line and the CC2 line is coupled to the port configuration line 33 and the other is coupled to the plug power supply line 37.

And now, in an initial state, the switch SWP is set in a conductive (ON) state.

The connector 11 is provided such that connection can be made by contact with any side of the upper surface and the backside surface of the plug 31.

When the connector 11 makes connection by contact with the upper surface of the plug 31, the CC1 line and the plug power supply line 37 are coupled. Also, the CC2 line and the port configuration line 33 are coupled.

On the other hand, when the connector 11 makes connection by contact with the backside surface of the plug 31, the CC1 line and the port configuration line 33 are coupled. Also, the CC2 line and the plug power supply line 37 are coupled.

According to switching over of the switches SW, it is possible to identify which side, the upper surface or the backside surface of the plug 31, by contact with which connection is made.

Then, the maintenance process is described.

Figure 5:
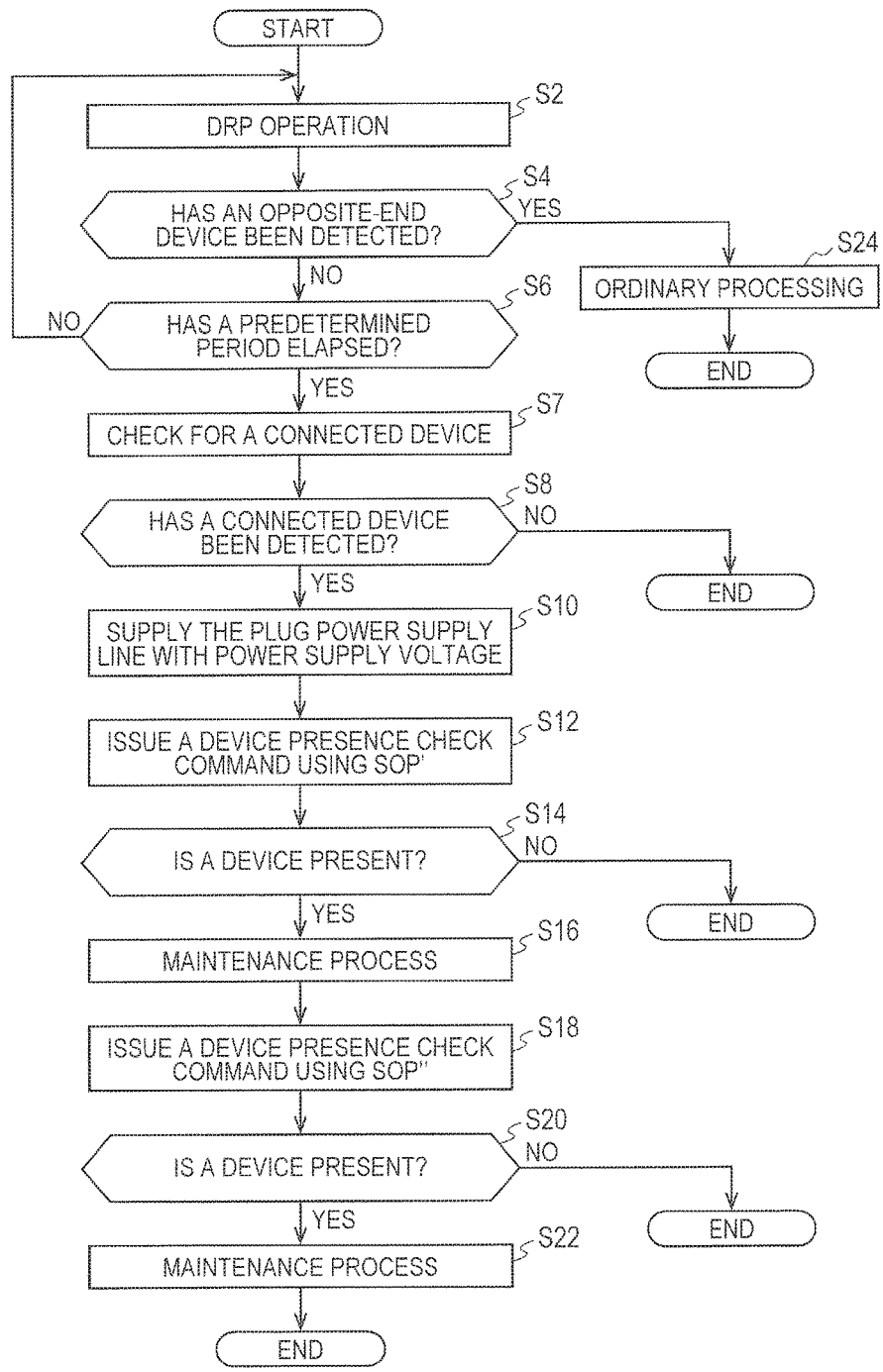
FIG. 5 is a flow diagram of a maintenance process based on an embodiment.

FIG. 5 is a flow diagram of the maintenance process based on an embodiment.

This process is primarily performed by the PD controller 13.

As depicted in FIG. 5, the PD controller 13 executes a DRP operation (step S2). The DRP (dual role port) operation, which is defined by USB standards, is switching between a source port operation and a sink port operation by making either Rd resistors or Rp resistors active in a certain cycle. This operation enables it to detect and communicate with an opposite-end device, no matter if the opposite-end device is coupled through any of the source, sink, and DRP ports.

Next, the PD controller 13 decides whether or not an opposite-end device has been detected (step S4).

If having decided that an opposite-end device has been detected at step S4 (YES at step S4), the PD controller 13 executes ordinary processing between it and the detected opposite-end device (step S24), and terminates the process (END).

Otherwise, if having decided that an opposite-end device is not detected at step S4 (NO at step S4), the PD controller 13 then decides whether a predetermined period has elapsed (step S6).

If having detected that an opposite-end device is not detected at step S6, the PD controller 13 returns to step S2 and repeats the foregoing steps of processing for a predetermined period.

If having decided that a predetermined period has elapsed at step S6 (YES at step S6), the PD controller 13 performs checking for a connected device (step S7).

Specifically, this step applies a power supply voltage to the configuration channel lines CC1, CC2 via resistors (Rp) (Rp resistors ON).

Figure 6:
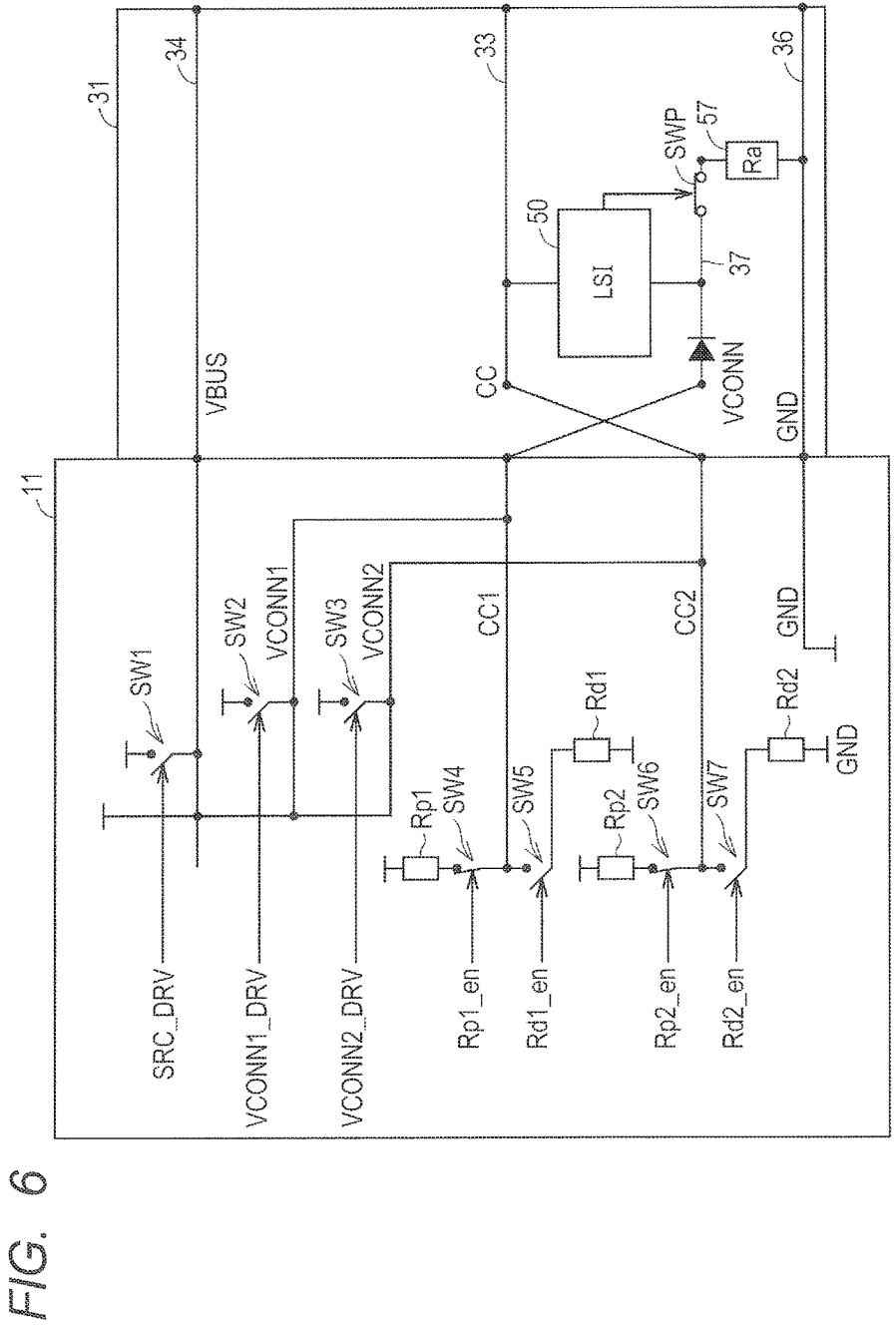
FIG. 6 is a diagram to explain an internal configuration of the connector 11, when connection to Rp resistors is made, based on an embodiment.

FIG. 6 is a diagram to explain an internal configuration of the connector 11, when connection to the Rp resistors is made, based on an embodiment.

As depicted in FIG. 6, the PD controller 13 inputs control signals Rp1_2n and Rp2_en ("H" level by way of example) and makes the relevant switches SW conductive.

This makes both the CC1 and CC2 lines coupled to the power supply. One CC line which is coupled to the plug power supply line 37 for the plug 31 is set at a predetermined voltage level by a resistor 57. The other CC line is coupled to the port configuration line 33.

The PD controller 13 detects the voltage levels of the CC lines and detects which CC line is coupled to the plug power supply line 37. As an example, the PD controller 13 decides whether or not an intermediate voltage has been detected, resulting from resistance division by the resistors Rp and Ra.

In the present example, the PD controller detects that the CC1 line is coupled to the plug power supply line 37.

The PD controller also detects that the CC2 line is coupled to the port configuration line 33.

With reference to FIG. 5 again, the PD controller 13 decides whether a connected device has been detected (step S8). Specifically, the PD controller decides whether or not either the CC1 line or the CC2 line is set at a predetermined voltage level, as described with FIG. 6.

If either the CC1 line or the CC2 line is set at a predetermined voltage level, the PD controller decides that a connected device has been detected. Also, it decides that the CC line set at a predetermined voltage level has been coupled to the plug power supply line 37 and that the other CC line has been coupled to the port configuration line 33.

If having decided that a connected device has been detected at step S8 (YES at step S8), the PD controller 13 supplies the plug power supply line 37 with a power supply voltage (step S10).

Otherwise, if having decided that a connected device is not detected at step S8 (NO at step S8), the PD controller 13 terminates the process (END).

Figure 7:
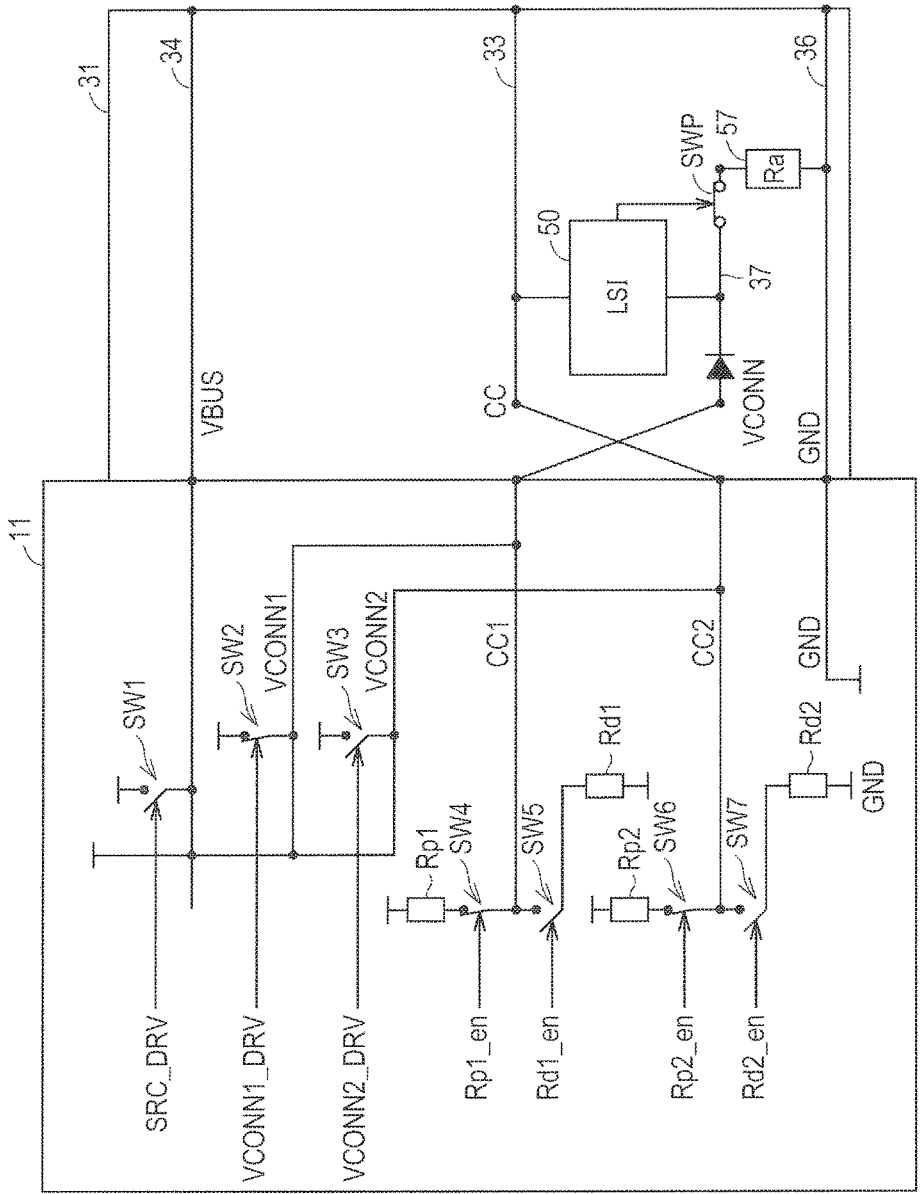
FIG. 7 is a diagram to explain an example of supplying a plug power supply line 37 with a power supply voltage based on an embodiment.

FIG. 7 is a diagram to explain an example of supplying the plug power supply line 37 with a power supply voltage based on an embodiment.

As depicted in FIG. 7, the PD controller 13 inputs a control signal VCONN1_DRV ("H" level by way of example) and makes the switch SW2 conductive.

This makes the CC1 line coupled to the power supply and the plug power supply line 37 is supplied with a power supply voltage.

The authentication controller 5 within the plug 31 starts up, once the plug power supply line 37 has been supplied with a power supply voltage. All components of the authentication controller 50 are activated so that they can perform various functions, once this line has been supplied with a power supply voltage.

And now, the LSI 50 sets the switch SWP in a non-conductive (OFF), once the plug power supply line 37 has been supplied with a power supply voltage. This shuts off a current flow to the ground line 36 via the resistor (Ra) 57, so that power consumption can be reduced.

With reference to FIG. 5 again, next, the PD controller 13 issues a device presence check command using SOP' (step S12). Specifically, the PD controller 13 issues a device presence check command using SOP' to the authentication controller 50 through the port configuration line 33.

It is possible to use a VDM (Vendor Defined Message) format or the like for information exchange between the PD controller 13 and the authentication controller 50. By sending a vendor specific data stream defined in VDM and sending back a vendor specific data stream as its response, mutual verification between the PD controller 13 and the authentication controller 50 is implemented.

As a vendor defined message (VDM), a SOP' (Start of Packet Sequence Prime) packet which indicates the start of a sequence is used. A device presence check command is sent with SOP' from the PD controller 13 to the authentication controller 50 through the port configuration line 33.

Upon receiving the device presence check command using SOP', the authentication controller 50 sends back a response signal to the PD controller 13 through the port configuration line 33.

Next, at step S14, the PD controller 13 decides whether or not a device is present (step S14). Specifically, the PD controller 13 decides whether or not it has received a response signal in response to the device presence check command using SOP'. The PD controller 13 decides that a device is present, if having received a response signal in response to the device presence check command using SOP'. Then, it proceeds to a next step S16.

If having decided that a device is present at step S14 (YES at step S14), the PD controller 13 executes the maintenance process (step S16). Specifically, using a SOP' packet, the PD controller 13 sends data required for maintenance (maintenance information) to the authentication controller 50 through the port configuration line 33. The authentication controller 50 receives the maintenance information from the PD controller 13 and executes the maintenance process. For example, the authentication controller 50 updates information stored on the memory 53 based on the maintenance information. For another example, the authentication controller 50 may access the authentication chip 40 via the peripheral block 52 and update data existing in the authentication chip 40.

This process makes it possible to access the authentication controller 50 provided in the plug 31 within the USB cable 30 an update the internal data of the authentication controller 50.

Next, the PD controller 13 issues a device presence check command using SOP"(step S18). Specifically, the PD controller 13 issues a device presence check command using SOP" to the authentication controller within the plug 32 through the port configuration line 33.

Upon receiving the device presence check command using SOP", the authentication controller 60 within the plug 32 sends back a response signal to the PD controller 13 through the port configuration line 33.

Next, at step S20, the PD controller 13 decides whether or not a device is present (step S20). Specifically, the PD controller 13 decides whether or not it has received a response signal in response to the device presence check command using SOP". The PD controller 13 decides that a device is present, if having received a response signal in response to the device presence check command using SOP". Then, it proceeds to a next step S22.

If having decided that a device is present at step S20 (YES at step S20), the PD controller 13 executes the maintenance process (step S22). Specifically, using a SOP" packet, the PD controller 13 sends data required for maintenance (maintenance information) to the authentication controller 60 through the port configuration line 33. The authentication controller 60 receives the maintenance information from the PD controller 13 and executes the maintenance process. For example, the authentication controller 60 updates information stored on the memory 53 based on the maintenance information. For another example, the authentication controller 50 may access the authentication chip 70 via the peripheral block 52 and update data existing in the authentication chip 70.

Then, the PD controller terminates the process (END).

Through the method based on the present embodiment, even when an opposite-end device is not coupled to the maintenance device 10 through the USB cable 30, it is possible to access the authentication controllers 50, 60 in the plugs 31, 32 of the USB cable 30. Specifically, a check is made of whether or not a connected device is present and, if it has been decided that a connected device is present, the plug power supply line is supplied with a power supply voltage to activate the authentication controllers 50, 60.

Then, the PD controller 13 sends maintenance information to the authentication controllers 50, 60 through the port configuration line 33, thereby enabling the authentication controller 50, 60 to execute the maintenance process.

In this way, it is possible to access the internal devices within the USB cable and execute the maintenance process in a simple way.

And now, in the present example, the configuration in which the authentication controllers are included in both the plugs 31, 32 respectively was described; however, in an alternative configuration, an authentication controller may be included in either of the plugs. In that case, only SOP' will be used.

Additionally, in the present example, the configuration in which the resistors Rp, Rd and the switch for controlling the VBUS line, VCONN line, and CC line are arranged within the connector 11 was described; however, in an alternative configuration, apart or all of these components may be arranged within the PD controller 13.

Second Embodiment

Figure 8:
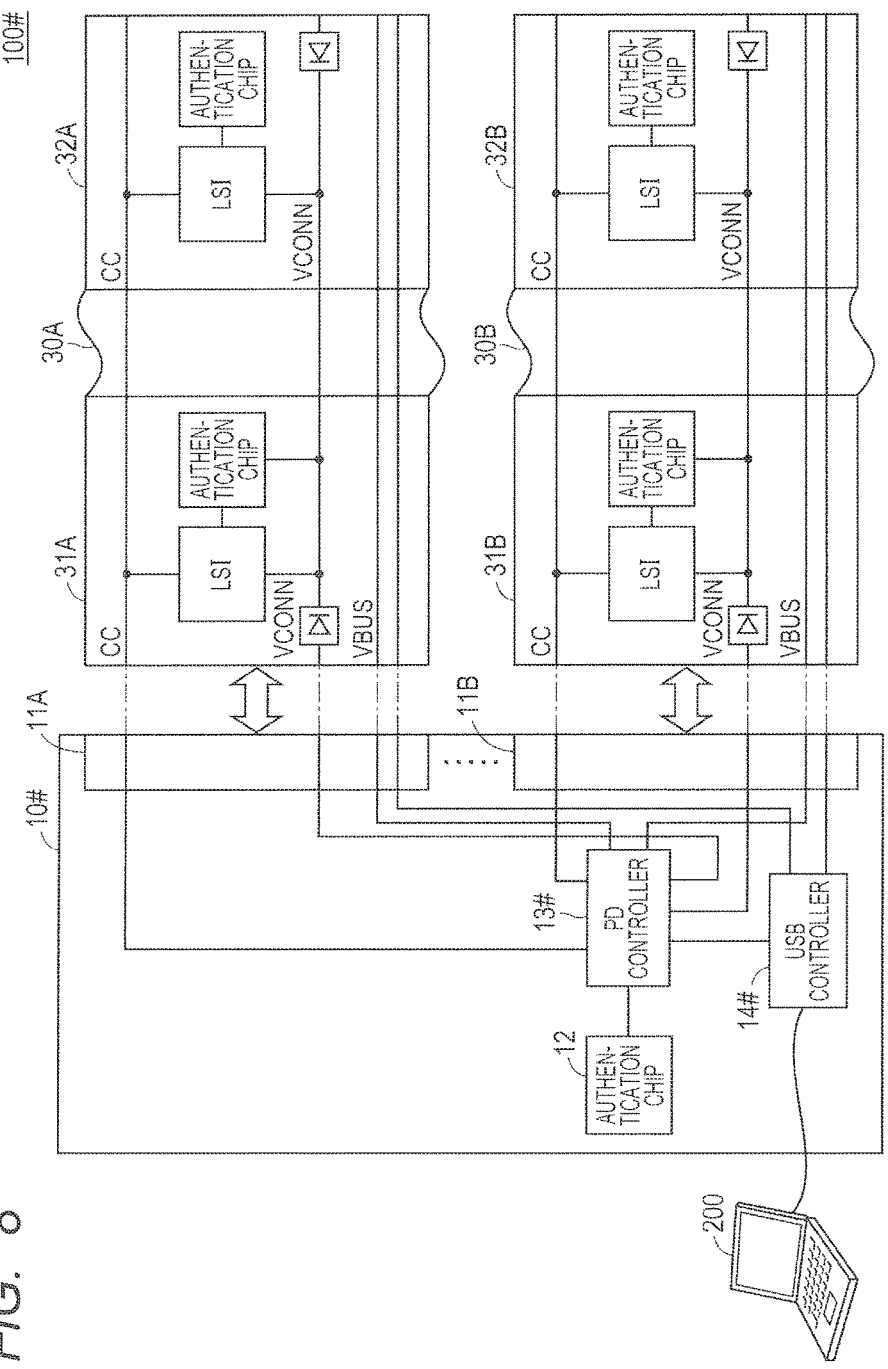
FIG. 8 is a diagram depicting a configuration of a semiconductor system 100# based on a second embodiment.

FIG. 8 is a diagram depicting a configuration of a semiconductor system 100# based on a second embodiment.

With reference to FIG. 8, the semiconductor system 100# includes a maintenance device 10# and USB cables 30A, 30B.

The maintenance device 10# is equipped with a plurality of connectors. In the present example, the maintenance device 10# is equipped with connectors 11A, 11B.

The maintenance device 10# includes an authentication chip 12, a PD controller 13#, and a USB controller 14#.

The authentication chip 12 stores authentication data for making connection with a genuine product.

The USB controller 14 controls the maintenance device 10 as a whole.

The PD controller 13# is coupled to various signal lines and the various signal lines are driven according to instructions of the PD controller 13#.

The USB cables 30A, 30B have the same configuration as the USB cable 30 and, therefore, a detailed description on their configuration is not repeated.

The plugs 31A, 31B of the USB cables 30A, 30B are coupled to the connectors 11A, 11B, respectively.

In the second embodiment, it is possible to get parallel access to each of authentication controllers which are respectively included in the plugs 31A, 31B of the USB cables 30A, 30B coupled to the connectors 11A, 11B, respectively. Specifically, a check is made of whether or not a connected device is present and, if it has been decided that a connected device is present, the plug power supply line is supplied with a power supply voltage to activate the authentication controllers 50, 60.

Then, the PD controller 13# sends maintenance information to the authentication controllers 50, 60 through the port configuration line 33, thereby enabling the authentication controller 50, 60 to execute the maintenance process.

In this way, it is possible to access the internal devices within a plurality of USB cables and execute the maintenance process in a simple way.

And now, in the present example, the configuration in which the authentication controllers are included in both the plugs 31A, 32A, 31B, 32B respectively was described; however, in an alternative configuration, an authentication controller may be included in either of the plugs. In that case, only SOP' will be used.

<Other Configurations>

In the present embodiment, the configuration in which the terminal 200 and the maintenance device 10 each are provided independently was described; however, in an alternative configuration, it is possible that the terminal 200 and the maintenance device 10 are provided integrally.

In the present example, for a case where an opposite-end device is not detected, the configuration for executing the maintenance process in a state that only the USB cable is connected to the maintenance device 10 was described. However, even in a case where an opposite-end device is coupled, the maintenance process may be executed in the same way, even when the maintenance device 10 does not detect the opposite-end device in the DRP operation at step 2 in FIG. 5 in consequence of a state of the PD controller of the opposite-end device (such as a state in which memory data is placed in an initial state and the resistors Rp, Rd cannot become active).

While the invention disclosed herein has been described specifically based on its embodiments hereinbefore, it will be appreciated that the present invention is not limited to the described embodiments and various modifications may be made thereto without departing from the gist of the invention.

What is claimed is:

1. A semiconductor device which is able to be coupled to at least one USB cable, the semiconductor device comprising:
   a decision unit that decides whether or not an opposite-end device is detected through the USB cable; and
   a control unit that, if the decision unit has decided that the opposite-end device is not detected through the USB cable, supplies one of two lines which are coupled to an internal device within the USB cable with a power supply voltage and implements control of communication with the internal device within the USB cable through the other one of the lines,
   wherein the control unit is further configured to update a plurality of data stored in the internal device while at least one plug of the USB cable is unplugged.

2. The semiconductor device according to claim 1,
   wherein the control unit detects a line which is provided with a resistor having a predetermined resistance out of the two lines within the USB cable,
   wherein the control unit supplies one line which is coupled to the resistor having a predetermined resistance with a power supply voltage; and
   wherein the control unit implements control of communication with the internal device within the USB cable through the other line which is not coupled to the resistor having a predetermined resistance.

3. The semiconductor device according to claim 1,
   wherein the control unit updates information being stored on the internal device.

4. The semiconductor device according to claim 1,
   wherein the internal device is provided in at least either of first and second connection plugs for making coupling with a device provided at each of both ends of the USB cable.

5. The semiconductor device according to claim 4,
   wherein a first internal device is provided in the first connection plug;
   wherein a second internal device is provided in the second connection plug;
   wherein the control unit implements control of communication with the first internal device using a first command through the other line; and
   wherein the control unit implements control of communication with the second internal device using a second command through the other line.

6. The semiconductor device according to claim 4,
   wherein the semiconductor device is provided to be able to be coupled to a plurality of the USB cables,
   wherein the decision unit decides whether an opposite-end device is detected through each of the USB cables; and
   wherein, with respect to each of the USB cables for which the decision unit has decided that the opposite-end device is not detected through each of the USB cables, the control unit supplies one of two lines within the USB cable with a power supply voltage and implements control of communication with an internal device within each of the USB cables through the other one of the lines.

7. The semiconductor according to claim 1,
   wherein the semiconductor device is configured to couple to any of a first plug of the USB cable and a second plug, opposite the first plug, of the USB cable,
   wherein the at least one plug is one of the first plug and the second plug,
   wherein the control unit is further configured to decide whether the opposite-end device is detected through the USB cable by cycling, until a predetermined period has elapsed, through a plurality of iterations of dual role port (DRP) operation in which at least a first cycle comprises the semiconductor device performing DRP source port operations at the at least one plug and a second cycle comprises the semiconductor device performing DRP sink port operations at the at least one plug.

8. A method of controlling a semiconductor device which is coupled to at least one USB cable, the method comprising the steps of:
   deciding whether or not an opposite-end device is detected through the USB cable;
   if having decided that the opposite-end device is not detected through the USB cable, supplying one of two lines which are coupled to an internal device within the USB cable with a power supply voltage;
   implementing control of communication with the internal device within the USB cable through the other one of the two lines; and
   updating a plurality of data stored in the internal device while at least one plug of the USB cable is unplugged.

9. A semiconductor system comprising:
   at least one USB cable; and
   a semiconductor device which is able to be coupled to the USB cable, the USB cable comprising:
  two lines; and
  an internal device which is coupled to the two lines,
the semiconductor device comprising:
  a decision unit that decides whether or not an opposite-end device is detected through the USB cable; and
  a control unit that, if the decision unit has decided that the opposite-end device is not detected through the USB cable, supplies one of the two lines with a power supply voltage and implements control of communication with the internal device through the other one of the lines,
wherein the control unit is further configured to update a plurality of data stored in the internal device while at least one plug of the USB cable is unplugged.

* * * * *